United States Patent Office 3,706,754
Patented Dec. 19, 1972

3,706,754
METHOD FOR PREPARING 2,3-PYRIDINEDIOL
John Valdemar Brammer Petersen and Niels Clauson-Kaas, Farum, Denmark, assignors to Ciba-Geigy Corporation, Ardsley, N.Y.
No Drawing. Division of application Ser. No. 751,650, June 25, 1968, now Patent No. 3,553,224, which is a division of application Ser. No. 544,685, Apr. 25, 1966, now Patent No. 3,419,570. Divided and this application Aug. 19, 1970, Ser. No. 65,334
Claims priority, application Switzerland, Apr. 29, 1965, 5,938/65, 5,939/65, 5,940/65
Int. Cl. C07d 31/30
U.S. Cl. 260—297 R  3 Claims

ABSTRACT OF THE DISCLOSURE 2,3-pyridinediol is prepared by hydrolyzing the reaction mixture of furfural, a chlorinating agent and sulfamic acid.

CROSS REFERENCE

This application is a division of our earlier copending application Ser. No. 751,650, filed June 25, 1968, now U.S. Pat. No. 3,553,224, Jan. 5, 1971 the latter being a division of our earlier application Ser. No. 544,685, filed Apr. 25, 1966, now U.S. Pat. No. 3,419,570, dated Dec. 31, 1968.

DETAILED DESCRIPTION

The present invention relates to a process for the production of 2,3-pyridinediol.

More particularly, the present invention relates to a process for the production of 2,3-pyridinediol comprising (1) reacting with each other in an aqueous medium
 (a) furfural,
 (b) a chlorinating agent selected from among chlorine and an agent releasing chlorine in aqueous medium, the molar ratio of (a) to (b) ranging from about 1:1 to 2:3, and
 (c) sulfamic acid, and adjusting the pH of the reaction mixture during the ensuing reaction to below 2,
(2) hydrolyzing the resulting mixture, and
(3) recovering the 2,3-pyridinediol formed in the resulting hydrolyzate from the latter.

In a preferred embodiment, step (3) is carried out by adding an alkaline agent in sufficient amount to adjust the pH of the reaction mixture to about 4 to 5, and by extracting 2,3-pyrinediol from the hydrolyzate with ether.

The 2,3-pyrinediol is obtained from the reaction mixture containing 3-hydroxy-2-oxo - 1(2H) - pyridine sulphonic acid by storing this mixture at room temperature or heating it, optionally, after the addition of a substance or mixture of substances providing at least an equimolar content of alkali metal ions, preferably of sodium ions.

Water can serve as reaction mixture medium for the chlorination and reaction with sulfamic acid; with high concentrations of the reaction components it is recommended to use a mixture of water and a solvent which is miscible therewith or easily soluble therein such as, e.g. methanol, ethanol, propanol, isopropanol, tert.butanol, methoxyethanol, ethoxyethanol, n-butoxyethanol, dimethyl formamide, acetic acid or dioxan.

The chlorine can be introduced into the reaction, for example, in the gaseous state or as sodium hydrochlorite. Examples of suitable catalysts for the chlorination are bromides and diodes which are soluble in the reaction medium such as sodium bromide or potassium iodide, or other inorganic compounds such as molybdenum salts which, in this step of the process increase the yields in oxidation with halogen. The chlorination is preferably performed at a pH below 6.

Sulfamic acid, the amount of which should preferably be 0.5–1.5 mol calculated on the furfural, can be added to the aqueous chlorinated furfural solution either as such or in the form of one of its salts such as the sodium salt, or the potassium salt. The ensuing reaction should be performed in a strongly acid, e.g. in 1 N to 3 N mineral acid medium, care being taken to ensure that the conversion of all chlorine introduced during the chlorination is practically complete.

Preferably, a mixture (a) of free sulfamic acid and a strong mineral acid, e.g. concentrated hydrochloric acid, is added to the aqueous chlorinated furfural solution (b) containing sufficient cation-donating agent to precipitate the desired end product, the mixture (a) of sulfamic acid and mineral acid being of sufficient strength to impart to the resulting reaction mixture of (a) and (b), a pH below 0.5 and preferably below 0.

This practically eliminates the possibility of a reaction between sulfamic and chlorinated furfural at a pH above 0.5 or higher, which reaction would lead to the formation of 3-hydroxy-2-imino-1(2H)-pyridine sulfonic acid as byproduct, which latter acid is difficult to separate from the desired salt of 3-hydroxy-2-oxo-1(2H)-pyridine sulfonic acid.

The pH desired in any phase of the sequence of reactions according to the invention, can be attained by the addition of compounds having a basic or acid reaction, provided that the pH has not already been suitably adjusted by the reaction components and reaction products. Suitable basic compounds are, e.g. hydroxides, carbonates or acetates of the alkali metals or of ammonium ions. Suitable acid compounds are, e.g. hydrochloric acid, sulfuric acid and acid sulfates, as well as organic acids such as, e.g. acetic acid. The reaction with chlorine can be performed either before or after the addition of the sulfamic acid, but it is preferably performed beforehand. It is performed below 40° and above the solidification temperature of the reaction mixture, preferably however, between −10° and 10°.

The reaction of sulfamic acid and the furfural solution which may already have been treated with chlorine, is performed within a temperature range which is limited by the crystallization point of the reaction mixture and the boiling point thereof; it is preferably performed, however, between 0° and 20°.

To produce 2,3-pyrinediol, the above reaction mixture, which, optionally, but not necessarily, may contain an equimolar amount of alkali metal, e.g. sodium ions, i.e. in which the alkali metal 3-hydroxy-2-oxo-1(2H)-pyridine-sulfonate is present, can be stored at room temperature or boiled for a short time. The 2,3-pyridinediol formed is isolated by filtration or extraction, e.g. with diethyl ether, from the aqueous reaction mixture. Finally, 2,3-pyridinediol can be obtained from the mother liquor from which the sodium salt has been separated by storing or heating the latter and subsequent extraction as described.

Thanks to the novel process of the present invention, 2,3-pyrinediol, which has hitherto been obtained only with difficulty, has been rendered easily accessible, so that, from an economic point of view also, it is now readily available as starting material for the production of valuable organic compounds. In particular, it can be used as coupling component in the production of novel azo dyes.

The following examples will serve to further typify the nature of the present invention, but should not be construed as a limitation thereof.

EXAMPLE 1

(a) 71.0 g. of chlorine (=42.8 ml., measured at −80°, 1.00 mol) are introduced through a cylindrical sintering glass tube at 0° while stirring well into a suspension of 96.1 g. (1.00 mol) of furfural in 700 ml. of water, the addition being made within 30 minutes. During the reaction, the furfural is dissolved and a slight amount (about 5 g.) of an oily substance separates out simultaneously which clings to the walls of the reaction vessel. 40% sodium hydroxide solution is then added dropwise while stirring at 0° until the pH is 2 (about 200 g., 2.0 mol). The reaction mixture is decanted from the oily precipitate and diluted with water to 1000 ml. If the pale yellow solution cannot be further worked up immediately, it is cooled to about −25° at which temperature it can be stored for about 1 day without any noticeable alteration.

(b) 30 ml. of concentrated hydrochloric acid are added to 100 ml. (about 0.10 mol) of a reaction solution prepared according to Example 1(a) and 15.0 g. (0.15 mol) of pulverised sulfamic acid are added while stirring at 2°. After stirring for about 5 minutes, this mixture turns into a thick slurry as a voluminous precipitate of the sodium salt of 3-hydroxy-2-oxo-1(2H)-pyridine sulphonic acid is formed. It is stirred for, in all, 30 minutes at 2°, then the mixture is heated for 10 minutes at 100° whereupon it is converted into a very dark, clear solution. After cooling, the pH of the mixture is adjusted to 4.5 by the addition of 40% sodium hydroxide solution and it is continuously extracted with diethyl ether. Impure 2,3-pyridinediol is obtained. By dissolving this in 250 ml. of methanol, decolouring the solution with active charcoal, concentrating the solution to about 40 ml., cooling the filtering, 3.36 g. of 2,3-pyridinediol are obtained (30% of the theoretical); M.P. 249–252°.

EXAMPLE 2

63 ml. of sodium hypochlorite solution (containing 11.2 g. of active chlorine per 100 ml.)/(0.10 mol) are added dropwise within 10 minutes at 0° while stirring to a solution of 9.6 g. of furfural (0.10 mol) in 15 ml. of tert.butyl alcohol and 30 ml. of 3 N hydrochloric acid. After a few minutes, 13 g. of sulphaminic acid (0.13 mol) and 10 ml. of concentrated hydrochloric acid are added and the reaction mixture is heated for 15 minutes at 100° whereupon the greater part of the butyl alcohol is distilled. After cooling to room temperature, the pH of the reaction mixture is brought to 4 by the addition of sodium hydroxide solution and the reaction mixture is continuously extracted with diethyl ether. On evaporating the diethyl ether and recrystallising the residue from methanol, 3.50 g. (32% of the theoretical) of 2,3-pyridinediol, are obtained; M.P. 244–247°.

EXAMPLE 3

14 g. of chlorine (0.20 mol) are introduced at 0° while stirring vigorously into a suspension of 19 g. of furfural (0.20 mol) in 170 ml. of water. After adding 19 g. of sulfamic acid (0.20 mol), the temperature of the reaction mixture is raised to 25° for 3 minutes whereupon the sulfamic acid dissolves and reacts with the oxidation product.

The mixture then is heated for 10 minutes at 100° whereupon it is converted into a very dark, clear solution. After cooling, the pH of the mixture which contains 2,3-pyridinediol dissolved as hydrochloride is adjusted to 3 by the addition of 40% sodium hydroxide solution and it is continuously extracted with diethyl ether. Impure 2,3-pyridinediol is obtained. By dissolving this in 250 ml. of methanol, decoloring the solution with active charcoal, concentrating the solution to about 40 ml., cooling the filtering, 3.36 g. of 2,3-pyridinediol are obtained (30% of the theoretical); M.P. 249–252°.

What is claimed is:

1. A process for the production of 2,3-pyridinediol from furfural, consisting essentially of
   (1) reacting with each other in an aqueous medium
      (a) furfural,
      (b) a chlorinating agent selected from the group consisting of chlorine and an alkali metal hypochlorite in an aqueous medium, the molar ratio of (a) to (b) ranging from about 1:1 to 2:3, at a temperature range of from −10° C. to 40° C. and
      (c) sulfamic acid, and adjusting the pH of the reaction mixture during the ensuing reaction to below 2,
   (2) hydrolyzing the resulting reaction mixture in a aqueous medium, and
   (3) recovering the 2,3-pyridinediol formed in the resulting hydrolyzate from the latter by filtration or extraction.

2. A process as defined in claim 1, wherein step (3) is carried out by adding an alkaline agent in sufficient amount to adjust the pH of the reaction mixture to about 4 to 5.

3. A process as defined in claim 1, wherein step (3) is carried out by extracting 2,3-pyridinediol from the hydrolyzate with diethyl ether.

References Cited
UNITED STATES PATENTS 3,471,506  10/1969  Lei et al. _____ 260—297 R ALAN L. ROTMAN, Primary Examiner U.S. Cl. X.R.

260—294.8 R